Jan. 15, 1957   E. F. NICHOLS   2,777,427
FLUID PRESSURE MOTOR
Filed May 24, 1954   2 Sheets-Sheet 1

INVENTOR.
ELTON F. NICHOLS
BY Eugene C. Knobloch
ATTORNEY

Jan. 15, 1957  E. F. NICHOLS  2,777,427
FLUID PRESSURE MOTOR
Filed May 24, 1954  2 Sheets-Sheet 2

ELTON F. NICHOLS
INVENTOR.

BY Eugene C. Knoblock
ATTORNEY

United States Patent Office 2,777,427
Patented Jan. 15, 1957

2,777,427

FLUID PRESSURE MOTOR

Elton F. Nichols, Livonia, Mich., assignor to Sprague Devices, Inc., Michigan City, Ind., a corporation of Indiana Application May 24, 1954, Serial No. 431,937

12 Claims. (Cl. 121—150)

This invention relates to improvements in fluid pressure motors which are well suited for use as a windshield wiper motor, and particularly relates to a motor of the general type and character operating upon a principle similar to that disclosed in my co-pending patent application, Serial No. 236,651, filed July 13, 1951, now Patent No. 2,727,494.

The primary object of this invention is to provide a fluid pressure motor of simple construction, which is composed of only a few parts and in which only three parts are movable, said parts being particularly well suited for fabrication by molding or casting, and particularly for molding from synthetic resin plastic material, such as one of the series of polyamide resins made by the polymerization of hexamethylenediamine salt of adipic acid or from polyethylene or other thermoplastic or thermosetting resins or from natural rubber or synthetic rubber.

A further object is to provide a device of this character having a valve unit of simple construction which may be preformed and preassembled and which may be applied to the motor housing as a unit and removed therefrom for replacement.

A further object is to provide a fluid pressure motor of substantial power, which operates in response to a difference in gaseous pressure acting at opposite sides of a pressure responsive member, which has long life, which avoids the requirement for mechanically actuated quick throw valve control mechanism, which is light in weight, which is sturdy, and which is substantially trouble-free in operation.

Other objects will be apparent from the following specification.

Figure 1:
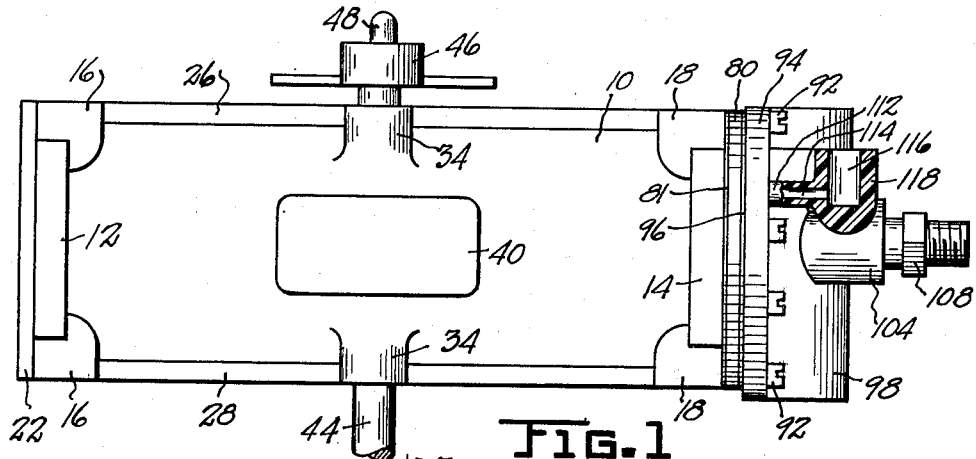
Fig. 1 is a view of the device in side elevation with parts broken away.

Referring to the drawings which illustrate the preferred embodiment of the invention, the numeral 10 designates a cylindrical body or housing of the device which is preferably molded from a synthetic resin material, such as one of the series of polyamide resins made by the polymerization of hexamethylenediamine salt of adipic acid or from polyethylene or other thermoplastic or thermosetting resins, or from natural rubber or synthetic rubber, or which may be molded or cast from metal.

The body preferably has an outwardly projecting circumferential flange 12 at one end thereof and a flange 14 at the other end thereof. Lugs 16 integral with the flange 12, and lugs 18 integral with the flange 14, may be formed at opposite ends of the housing to facilitate mounting of the device. The end of the housing 10 at the flange 12 is provided with a circular concentric groove 20 in its outer end. A closure plate 22 spans and closes the end of the housing adjacent the flange 12 and is preferably provided with an integral annular rib or flange 24 which fits snugly within the groove 20. The closure 22 is preferably cemented or otherwise secured to the housing 10 in sealed relation.

Figure 2:
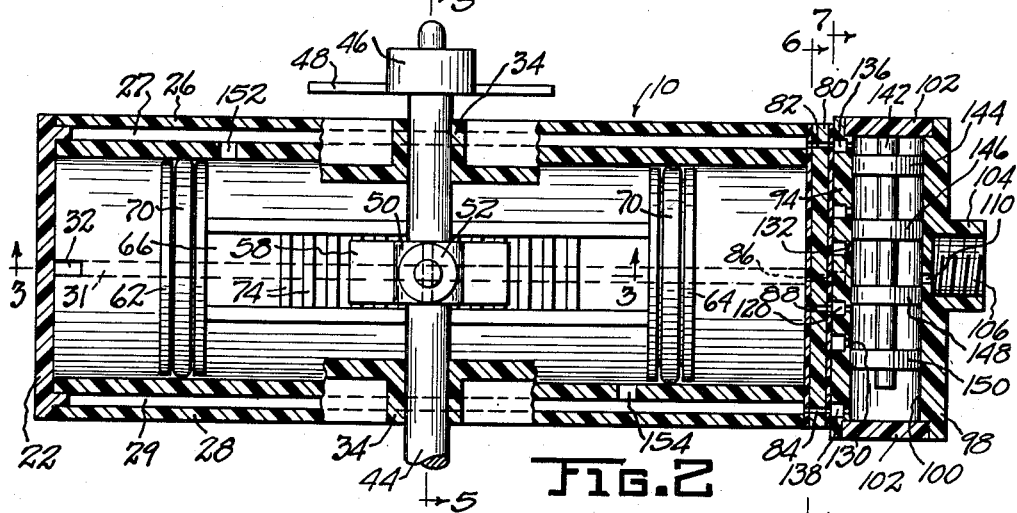
Fig. 2 is a longitudinal sectional view taken on line 2—2 of Fig. 5.
Figure 3:
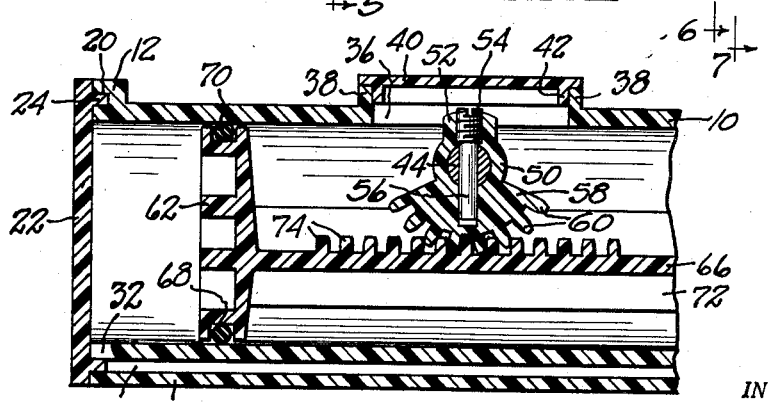
Fig. 3 is a fragmentary longitudinal sectional view taken on line 3—3 of Fig. 2.

Three longitudinal ribs 26, 28 and 30 are formed integrally with the housing 10 and extend full length thereof between the opposed flanges 12 and 14 with the ribs 26 and 28 being preferably substantially diametrically opposed, and the rib 30 being located between the ribs 26 and 28. A bore 27 is formed in the rib 26; a bore 29 is formed in the rib 28; and a bore 31 is formed in the rib 30. These bores extend not only through the ribs, but also through the flanges 12 and 14 so that they are open at each end of the housing 10. The bores preferably open at or adjacent the groove 20 so as to be intercepted by the flange 24. The arrangement is such that the passages 27 and 29 are sealed at the end of the housing mounting the closure plate 22, as illustrated at the left in Fig. 2. The passage 31 communicates with a notch or opening 32 extending inwardly from the end thereof a distance greater than the depth of the rib 24 so that air may pass from passage 31 through the notch 32 and into the interior of the housing 10, as best illustrated in Fig. 3. At the opposite end of the housing 10 the surface thereof is substantially smooth or planar, and the passages 27, 29 and 31 extend to and open at that smooth end surface.

Figure 5:
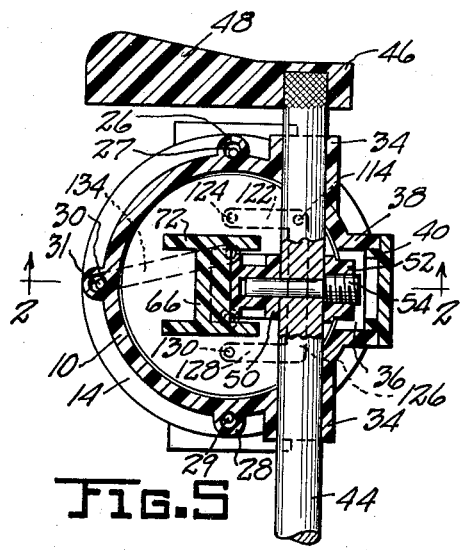
Fig. 5 is a transverse sectional view taken on line 5—5 of Fig. 2.

A pair of axially aligned tubular projections 34 are formed adjacent the longitudinal center of the housing 10 with their axes transverse of the axis of the body 10 but spaced or offset therefrom, as best illustrated in Fig. 5. An opening 36 is formed in the housing 10 adjacent the center thereof, the same being preferably of elongated substantially rectangular shape and being substantially diametrically opposed to the rib 30 and being located adjacent to the tubular projections 34 so that the axis of said tubular projections lies between said opening and the longitudinal axis of the housing 10. The opening 36 is preferably defined by an outwardly projecting marginal rib or neck 38 having a flat outer surface against which seats the marginal portion of an access plate or closure member 40 which preferably has an inwardly projecting rib 42 adapted to project into the opening 36 and the neck 38 to firmly locate the closure plate 34 and to provide a snug fit which will normally serve to retain the plate 40 in operative position upon the housing 10 but which will accommodate removal of said closure plate from the housing 10.

The tubular members 34 serve to journal a shaft 44 which preferably projects from the housing at both ends. One end of the shaft 44 is adapted to mount a windshield wiper arm (not shown), and the other end of the shaft may mount a head 46 having laterally projecting members, plates or arms 48 which may readily be grasped by the hand for the purpose of rocking the shaft 44.

A sleeve 50 fits on the shaft 44 within the housing 10 and substantially in alignment with the opening 36 so as to be accessible through that opening. This sleeve may have a projection 52 extending radially thereof and having a screw-threaded bore for the reception of the screw-threaded end portion 54 of a locking pin 56 extending diametrically through the sleeve and adapted to pass through an aperture in the shaft 44 to positively anchor the sleeve 50 upon the shaft 44 against free rocking or rotation thereof. A gear segment 58 is carried by the sleeve 50, being preferably formed integrally therewith and preferably being of an angular extent less than 180 degrees, as best seen in Fig. 3. The length of the opening 36 will be such that its opposite ends are spaced from the axis of the shaft 44 a distance greater than the diameter of said gear at the crest of the teeth 60 thereof so that the gear segment may rock in said opening 36 at the extreme ends of its movement. The width of the opening 36 will be greater than the width of the gear segment 58.

A piston unit is mounted reciprocally in the housing 10 and includes spaced piston members 62 and 64 which are interconnected by a longitudinal rigid bar portion 66. The piston members 62 and 64 are spaced apart a distance substantially less than the overall length of the body 10. Each of these pistons has a peripheral groove 68 in which a resilient annular sealing member 70 is seated. The sealing members 70 are preferably O-rings formed of rubber or synthetic rubber and are of such size and dimension as to be slightly thicker than the depth of the groove which receives them so as to be somewhat "squeezed" within the groove and in contact with the interior surface of the tubular body portion, in the manner well understood in the art. The bar portion 66 is rigid and preferably is molded or cast integrally with the pistons 62, 64. The bar portion 66 will preferably be reinforced by its cross-sectional shape which, as best seen in Fig. 5, may be of substantially H shape by the provision of reinforcing flanges 72 at opposite sides thereof projecting from opposite faces of the bar 66 and spaced apart a distance greater than the width of the gear segment 58. The bar 66 is provided with teeth 74 adapted to mesh with the teeth 60 of the gear segment 58, thus providing a rack for translation of reciprocating motion of the piston unit into rotative rocking movement of the gear segment and the shaft 44.

Figure 6:
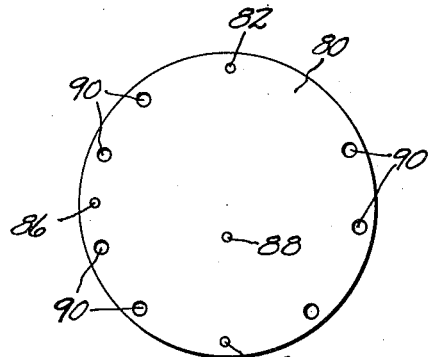
Fig. 6 is a face view of a plate member employed in the device for the purpose of assisting in the definition of the passages communicating with the valve housing, as viewed on line 6—6 of Fig. 2.

A flat disk or plate 80, as best illustrated in Fig. 6, is mounted upon the right-hand end of the housing 10. If desired, a gasket 81 may be interposed between the plate 80 and the end of the housing 10, but this is not essential. The plate or disk has an aperture 82 therein for registration and communication with the passage 27 of the housing. An aperture 84 in the plate is aligned with and communicates with the passage 29 in the housing. An aperture 86 in the plate registers with and communicates with the passage 31 in the housing. In its intermediate portion, preferably somewhat off-center as illustrated in Fig. 6, an aperture 88 is provided which communicates with the interior of the cylindrical housing at the end thereof. A plurality of apertures 90 formed in the margin of the plate are adapted to receive the shanks of securing screws whose heads only are illustrated at 92 in Fig. 1.

Figure 7:
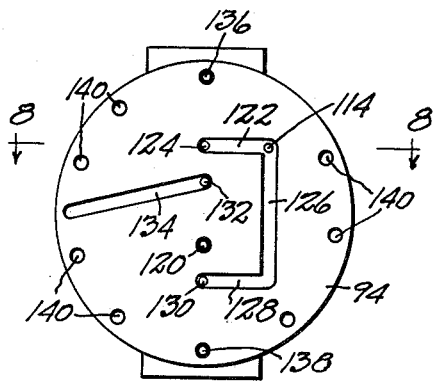
Fig. 7 is an inner face view of the valve housing member which cooperates with the part shown in Fig. 6 to define passages in the device, said member being viewed on line 7—7 of Fig. 2.
Figure 8:
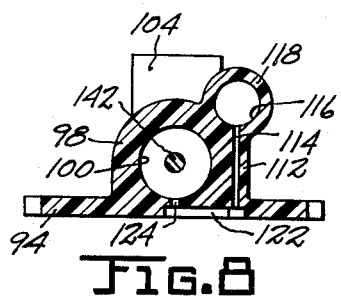
Fig. 8 is a transverse sectional view of the valve housing taken on line 8—8 of Fig. 7.

An end plate 94 of the construction best illustrated in Figs. 7 and 8, bears against the plate 80 or preferably against a gasket 96 which is interposed between the same and the plate 80 and which is secured by the securing screws 92. The plate 94 preferably has molded integrally therewith, or otherwise secured and carried thereby, a cylindrical projection 98 having a bore 100 whose axis is positioned perpendicularly to the axis of the housing 10 and intersects the same. Closure members 102 are removably mounted in the opposite ends of cylindrical member 98 to close the same and normally provide a sealed engagement therewith to prevent escape of fluid from the ends of the member 98. A neck 104 projects from the part 98 and preferably has an interiorly screw-threaded socket 106 to receive a fitting 108 for connection with a fluid pressure line (not shown). A restricted port 110 is formed at the inner end of the socket 106 to control the discharge of air from the line connecting the fitting 108 into the bore 100 of the member 98. A rib 112 extends from the plate 94 along the side of the projection 98 and has a bore 114 which communicates with a bore 116 of an enlargement 118 formed on the member 98.

The end plate 94 has an aperture 120 therein aligned with the aperture 88 and communicating with the interior of the chamber 100. A substantially U-shaped groove is formed in the inner face of the plate 94. One run 122 of the groove extends from outlet port 114 to an aperture 124 communicating with the bore 100 spaced from the aperture 120. The remainder of the groove comprises a run 126 extending angularly from the run 122, and a run 128 substantially parallel to the run 122 and communicating with an aperture 130 passing through the wall and communicating with the interior of the member 98 at the bore 100. Each of the openings 120, 124 and 130 is preferably aligned with the axis of the bore 100, and the opening 130 is spaced from the opening 120, and the latter is interposed between the openings 130 and 124. An aperture 132 is formed in the plate 94 between the openings 120 and 124 and communicates with the bore 100. A groove 134 is formed in the inner face of the plate 94 and its outermost end is adapted to engage and register with the aperture 86 in the plate 80. An aperture 136 in the plate 94 is adapted to register and communicate with the aperture 82, and an aperture 138 in plate 94 is adapted to register and communicate with the aperture 84 of the plate 80. A plurality of apertures 140 register with the apertures 90 to receive the securing screws 92 which hold the parts in operative assembled relation.

Figure 4:
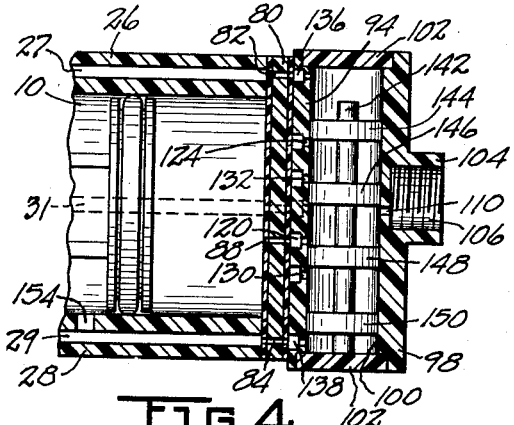
Fig. 4 is a fragmentary longitudinal sectional view similar to Fig. 2 but illustrating a different operative position of the device.

A valve unit is interposed in the bore 100, preferably being of the spool type having a shank portion 142 of a length shorter than the spacing between the end members 102 of the cylinder 98. A plurality of spaced enlarged disks or seals are included in the valve element, each thereof being mounted fixedly upon the shaft 142. These disks may fit with clearance in the bore 100 and be provided with O-rings or other seals similar to the seals 70 upon the piston, if desired. Any suitable construction may be employed, however, it being essential that the fit of each of these sealing disks shall be substantially airtight so that air may not pass therearound from the space between one pair to the space between another pair. For purposes of identification the disks bear the reference numerals 144, 146, 148 and 150, respectively. It will be observed that the endmost disks 144 and 150 are spaced from the ends of the stem 142. It will be observed that the spacing between the disks 144 and 146 is greater than the spacing between the apertures 124 and 132, and the width or axial dimension of the disk 146 is less than the spacing between said apertures 124 and 132. The spacing between the disks 146 and 148 is substantially equal to the spacing between the apertures 120 and 132. The spacing between the disks 148 and 150 is greater than the spacing between the apertures 120 and 130, and the axial dimension of the disk 148 is less than the spacing between the apertures 120 and 130. The spacing of the end disk 144 from the uppermost end of the stem 142 is greater than the spacing of the aperture 136 from the adjacent end member 102 as seen in Fig. 2. Likewise the spacing of the lowermost disk 150 from the end of the stem 142 is greater than the spacing of the aperture 138 from the adjacent end member 102, as best seen in Fig. 4. A further requirement is that each of the disks 144, 146, 148 and 150 shall be positioned clear of each of the apertures 136, 124, 132, 120, 130 and 138 in each of the two extreme positions of the valve, as illustrated in Figs. 2 and 4, when the ends of the stem abut the end members 102 of the cylinder.

An aperture 152 establishes communication between the passage 27 and the bore of the housing 10 spaced from one end thereof at a position intermediate said end and the shaft 44 and spaced from the opposite end thereof a distance greater than the length of the piston unit 62, 64, 66. An aperture 154 communicates with the passage 29 and the bore of the housing 100, and is located spaced from the plate 80. The spacing of aperture 154 from the end plate 22 is greater than the overall length of the piston unit 62, 64, 66.

In the operation of the device, assuming that the unit has been mounted in position by securing means (not shown) passed through the anchor portions 16 and 18, that a windshield wiper blade (not shown) has been mounted upon the shaft 44, and that a source of compressed air has been connected by a line with a fitting 108, reciprocation of the piston unit will occur to cause swinging of the windshield wiper blade when compressed air is delivered to the device at the fitting 108.

The operation of the device will be described first when the control valve is in the position illustrated in Fig. 2. In this position of the parts, air admitted at the port 110 into the valve chamber between the valve parts 146 and 148 passes through the port or aperture 132 in the plate 94 and thence through the groove 134 to the aperture 86 in plate 80 which communicates with the longitudinal bore 31. The air passes through the passage 31 to the opening 32 adjacent to the end wall 22 so as to enter the bore of the housing 10 at the left of the piston 62, as viewed in Fig. 2. The air acts to urge the piston unit to the right, and in doing so causes air between the piston 64 and the plate 80 to be discharged through the aperture 88 in the plate 80 and the aperture 120 in the plate 94 which registers with the aperture 88. The air so discharged into the bore 100 between the valve ports 148 and 150 then passes to aperture 130 to enter the groove 128, 126 which leads to the outlet port 114, 116. In other words, the position of the valve, as shown in Fig. 2, controls admission of compressed air at the lefthand end of the chamber 10 and its exhaust to atmosphere at the righthand end of chamber 10, thereby causing movement of the piston unit toward the right. This movement continues until the lefthand piston 62 uncovers the port 152. A by-pass for air is thus established so that air which enters the housing chamber at port 32 from the passage 31 is then free to pass through the port 152 and the passage 27 to and through the aperture 82 in the plate 80 and the aperture 136 in the plate 94. The air passing through aperture 136 enters the chamber 100 above the valve part 144 and acts upon the valve assembly to move the same downwardly toward the position shown in Fig. 4, and thus ends the stroke of the piston in a direction toward the right as viewed in Fig. 2. The valve chamber 100 is of smaller cross-section than the piston chamber and pistons 62, 64.

As soon as the valve unit assumes the position shown in Fig. 4, air which enters at the port 110 passes across the chamber 100 and passes through the aperture 120 in the plate 94 and through the aperture 88 in the plate 80 registering with the aperture 120. Thus air under pressure is introduced at the righthand end of the bore of the member 10 to act against the righthand piston 64 and cause it to move toward the left. The air trapped at the lefthand end of the housing 10 is evacuated through the opening 32, the passage 31, the aperture 86 in the plate 88 to and through the groove 134 in the plate 94 to the aperture 132 in the plate 94 so as to enter the bore 100 between the valve parts 146 and 144. The air then passes through the aperture 124 in the plate 94 into the groove 122 for exhaust at aperture 114 communicating with outlet 116. When the movement of the piston unit toward the left reaches such a position that the port 154 is uncovered, the air admitted to the righthand end of the housing at port 88 is by-passed through aperture 154 to the passage 29 so that it may flow to the aperture 84 in the plate 80 and thence through the aperture 138 in the plate 94 to enter the chamber 100 between the end wall 102 and the adjacent valve part 150. The pressure so admitted to the lower end of the valve chamber 100, as seen in Fig. 4, acts against the valve unit to shift it endwise to the position shown in Fig. 2 for recommencement of the phase of the cycle first above described.

One of the important characteristics of this device is its compactness with the valve 142—150 being mounted at one end of the cylinder and being of small size so that the overall dimensions of the device are small to facilitate installation of the device even though the valve unit is external of the housing. Another characteristic of importance is the arrangement using the dual plates 80 and 94 with grooves in one thereof, as in part 94, to accommodate flow of air through the partition separating the valve chamber from the working chamber in a plane common to that partition. The use of dual plates positioned face to face with the grooved face innermost avoids the necessity for complicated coring or bore-forming operations and makes possible an arrangement of the passages in the plane of the partition quickly, expeditiously and inexpensively.

Another of the important advantages of this construction is that the control valve may be preassembled as a unit and applied to the device as a unit. The unit construction of the valve permits its removal and replacement at will in the event of valve failure without requiring disassembly of any of the other operating parts of the device.

Another interesting characteristic of this device is that it has only three moving parts, namely, the piston unit 62, 64, 66, the gear segment 58 and its mounting shaft 44, and the spool or shiftable element of the valve. None of these parts are subjected to excessive mechanical stresses or strains in use, and therefore are capable of long life under normal operating conditions.

A further advantage of the device is that the problem of seals is simplified because of the ability to use O-ring seals at the pistons 62, 64, as illustrated at 70, and also the possibility of using similar O-ring seals upon each of the valve elements 144, 146, 148 and 150.

It will be apparent that the sweep or stroke of the device and the arc through which the shaft 44 rocks or rotates is determined by the location of the ports 152 and 154 relative to the length of the cylinder or housing 10 and the length of the piston unit 62, 64.

While the preferred embodiment of the invention has been illustrated and described herein, it will be understood that changes in the construction may be made within the scope of the appended claims without departing from the spirit of the invention.

I claim:

1. A fluid pressure motor comprising a sealed tubular body having an elongated piston chamber and a plurality of longitudinal passages open at one end and respectively communicating with said chamber at spaced points along the length of said chamber, a piston unit reciprocable in said chamber, a valve mounted at one end of said body and having a valve chamber, an outlet and an inlet, a wall separating said valve chamber and piston chamber and having a plurality of passages therein, some of said last named passages communicating with said first passages, portions of other wall passages extending therethrough to connect spaced portions of said valve chamber to said outlet, a pressure responsive valve element having similar opposed ends and shiftable in said valve chamber between two operative positions for controlling in one of two predetermined paths the flow of fluid from said inlet to and through said valve chamber, wall and chamber passages to a selected part of said piston chamber and for connecting the opposite part of said piston chamber in communication with said outlet, said piston being responsive to fluid pressure and being operative to change said flow path at a predetermined position in each of two opposite strokes thereof to divert fluid flow to an end of said valve chamber to shift said valve element so as to reverse the path of fluid flow in said piston chamber and the direction of movement of said piston in said chamber.

2. A fluid pressure motor as defined in claim 1, wherein said valve chamber is elongated and said wall passages communicate therewith at spaced points along the length thereof, and wherein said valve element has a plurality of spaced seals controlling fluid flow between said passages.

3. A fluid pressure motor as defined in claim 1, wherein said valve chamber is elongated and its axis extends in a direction transverse of the axis of said tubular body.

4. A fluid pressure motor as defined in claim 1, wherein said wall constitutes two confronting parts, each part having a passage-defining aperture therein out of register with a passage-defining aperture in the other, at least one part having a groove in its inner face extending from one of said apertures therein to a point registering with said disaligned aperture in the other part to complete a passage between said disaligned apertures.

5. A fluid pressure motor as defined in claim 1, wherein two of said body passages communicate with said piston chamber adjacent to but spaced from opposite ends thereof to accommodate the aforesaid flow reversing action of said piston, and a third body passage communicates with said piston chamber at the end thereof remote from said valve, at least one of said wall passages communicating directly with the piston chamber.

6. A fluid pressure motor comprising a tubular body, a piston reciprocable in said body, a valve carried by one end of said body and having a chamber transverse of said body, a pressure responsive valve member having similar opposed ends and shiftable longitudinally in said valve chamber, fluid inlet and outlet means controlled by said valve, and a plurality of means connecting said valve chamber and tubular body, each of said connecting means communicating with said body in longitudinally spaced relation to the others and each communicating with said valve chamber in longitudinally spaced relation to the others, and means connecting longitudinally spaced parts of said valve chamber with said outlet, said connecting means constituting ports and passages in a single member interposed between said valve and said body, said valve member controlling flow between said inlet, selected connecting means and said outlet to actuate said piston and said piston controlling flow through other connecting means to said valve chamber to shift said valve member.

7. A fluid pressure motor comprising a housing having a piston chamber, a valve chamber, a member interposed between said housing and valve chamber, a plurality of passages in said member connecting said chambers, and inlet and outlet ports communicating with said valve chamber, two of said passages being connected to opposite ends of said piston chamber and two other passages being connected to said piston chamber adjacent to but spaced from the opposite ends of said chamber, passages in said member connecting spaced parts of said valve chamber with said outlet, a valve in said valve chamber having similar opposed ends and selectively directing flow to one of said first passages, and a piston member in said piston chamber responsive to fluid pressure in said piston chamber and selectively directing flow through one of said other two passages to said valve chamber to actuate said valve at a predetermined portion of each stroke thereof.

8. A fluid pressure motor as defined in claim 7, wherein said housing is formed of multiple parts and said valve chamber is formed in one part containing said valve member and openings communicating with said passages to constitute a valve unit which is preassembled, and means detachably connecting together said valve unit and housing parts.

9. A fluid pressure motor as defined in claim 7, wherein said piston chamber and valve chamber are both elongated and extend in angular relation to each other.

10. A fluid pressure motor as defined in claim 7, wherein said housing includes a multi-part wall separating said chambers, said wall having parts of said passages extending therethrough, at least one of said wall parts having a groove in the face thereof confronting the other wall part to define a portion of a passage.

11. A fluid pressure motor as defined in claim 7, wherein each of said housing, piston and valve member constitutes a synthetic resin molding.

12. A fluid pressure motor as defined in claim 7, and annular resilient sealing means carried by said piston and valve member, said piston and valve member each having a peripheral groove receiving said sealing means and of a depth less than the thickness of said sealing means.

References Cited in the file of this patent

UNITED STATES PATENTS

| | | |
|---|---|---|
| 547,623 | Bartholomew et al. | Oct. 8, 1895 |
| 949,901 | Janik | Feb. 22, 1910 |
| 1,955,565 | Schmidt et al. | Apr. 17, 1934 |
| 2,429,426 | Phillips et al. | Oct. 21, 1947 |
| 2,515,956 | Greenberg | July 18, 1950 |
| 2,537,680 | Kupiec et al. | Jan. 9, 1951 |
| 2,635,586 | Kuhn | Apr. 21, 1953 |